ly in one form in the accom-
UNITED STATES PATENT OFFICE.

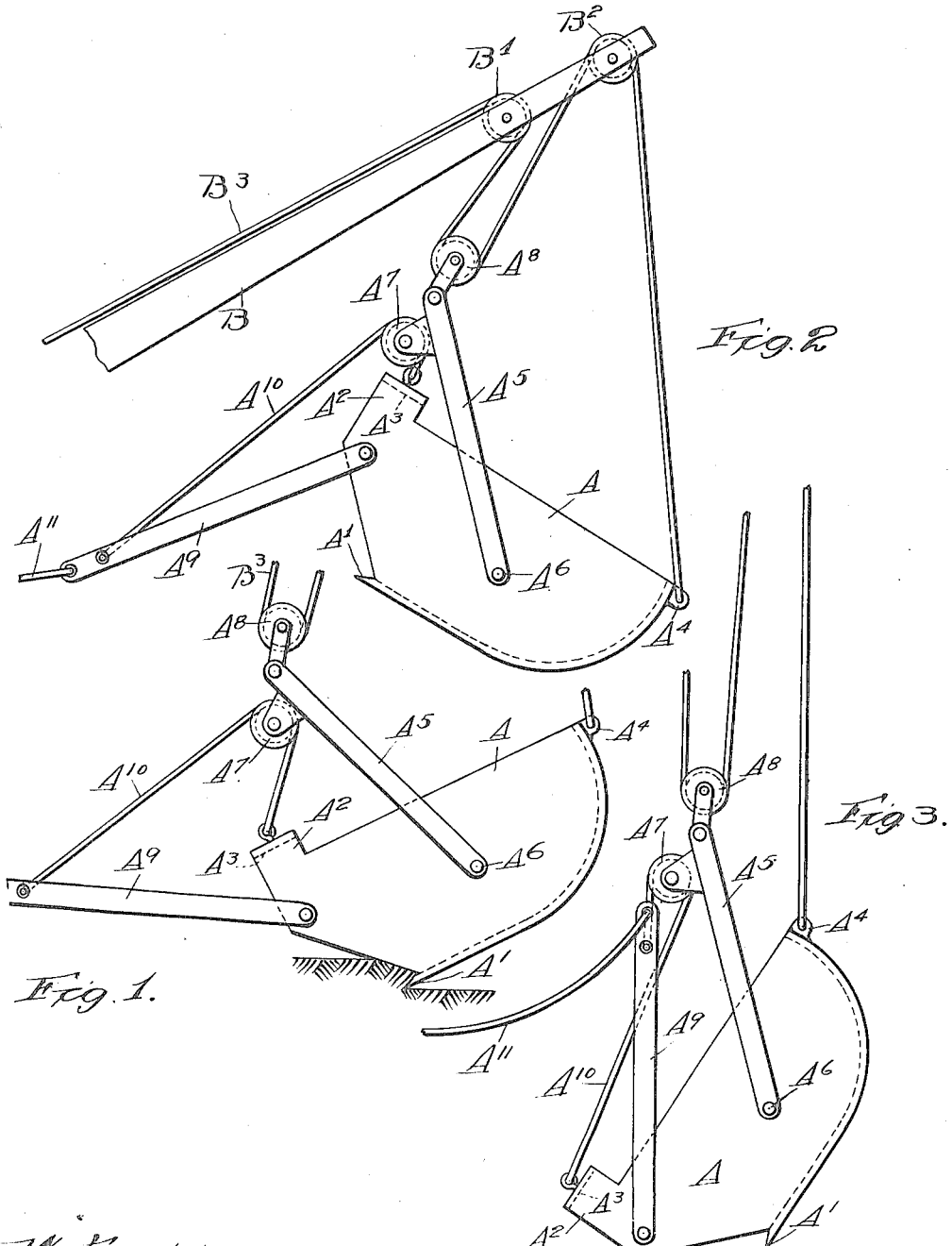

LAWRENCE ROYS, OF SOUTH MILWAUKEE, WISCONSIN, ASSIGNOR TO BUCYRUS COMPANY, OF SOUTH MILWAUKEE, WISCONSIN, A CORPORATION OF WISCONSIN.

DRAG-LINE EXCAVATOR.

1,135,928.  Specification of Letters Patent.  Patented Apr. 13, 1915.

Application filed May 3, 1913. Serial No. 765,230.

*To all whom it may concern:*

Be it known that I, LAWRENCE ROYS, a citizen of the United States, residing at South Milwaukee, in the county of Milwaukee and State of Wisconsin, have invented a certain new and useful Improvement in Drag-Line Excavators, of which the following is a specification.

My invention relates to improvements in drag line excavators and is illustrated diagrammatically in one form in the accompanying drawing, wherein—

Figure 1 shows the bucket about to be hoisted; Fig. 2 shows the bucket in the carrying position; and Fig. 3 shows the bucket in the dumping position.

Like parts are indicated by like letters throughout the several figures.

The excavating bucket A which is open at top and front is provided along the bottom edge in front with the cutting lip $A^1$. The sides of the bucket are cut away upwardly and forwardly from the cutting lip and terminate in upwardly projecting fingers $A^2$ connected by the reinforcing strip or member $A^3$ located above the upper edge of the sides. The anchor lug $A^4$ is centrally attached to the back end of the bucket. A hoisting yoke or bail $A^5$ is attached pivotally or rotatably to the bucket at the point $A^6$ substantially at the center of gravity. A sheave $A^7$ is rotatably mounted on this yoke or bail and a sheave $A^8$ is pivotally mounted free to swing with respect thereto. A drag line yoke or bail $A^9$ is pivotally or rotatably attached to the sides of the bucket near the front end in front of and slightly above the cutting lip or edge. A bridle $A^{10}$ is attached to the tie member $A^3$, passes over the sheave $A^7$ and attached at its other end to the outer end of the yoke or bail $A^9$. The drag line $A^{11}$ is attached to the outer end of the bail $A^9$ and with it and the bridle forms what is in effect a loop on the end of the drag line, since the bail is a substantial continuance of the drag line and might even take the form of a cable or flexible member instead of the rigid bail.

The drag line $A^{11}$ leads to any suitable form of hoisting engine not shown upon a derrick or boom support not shown from which rises the boom B. The boom B has rotatably mounted thereon the sheaves $B^1$ and $B^2$. A hoisting cable $B^3$ leads from the hoisting engine on the derrick frame not shown, over the sheave $B^1$, down over the sheave $A^8$ and back over the sheave $B^2$ to form a loop and then over the sheave $B^2$ to the lug $A^4$ where it is anchored or attached to the bucket. The hoisting rope thus takes the form of a three-part hoist having its dead end anchored or attached to the back end of the bucket. In effect, then, I provide a hoisting rope one part of which is rigidly attached to the bucket and the other two parts of which have a movable connection with the bucket yoke, the bucket yoke in turn having a movable connection with the loop on the end of the drag line.

The hoisting line in effect comprises a depending loop and end, the latter secured anywhere back of the center of gravity but preferably, of course, near the end of the bucket. The connection between the loop and the yoke is a movable one, of course, and this is preferably a sheave riding in the loop. The drag line has in effect a loop whereby it is connected near the forward end of the bucket and this loop has a movable connection with the loop of the hoisting line, and this is accomplished, of course, preferably with the use of a sheave. These two movable connections are, however, most conveniently attached to or near the end of the yoke. The yoke itself is preferably pivoted at the center of gravity though it might be removed from the center of gravity. The operation does not depend upon this connection being at the center of gravity. The drag line loop preferably is formed in part of a rigid bail.

It will be evident that, while I have shown in my drawing an operative device, still many changes might be made in size, shape and arrangement of parts without departing materially from the spirit of my invention, and I wish, therefore, that my drawing be regarded as in a sense diagrammatic.

The use and operation of my invention are as follows: When the bucket is in the excavating position the hoisting rope is slack and the hoising bail is inclined toward the front of the bucket. The drag line bail extends forwardly from the front of the bucket, being pivoted thereto at a point slightly above the point of application of the excavating resistance. When the drag line is hauled in it tends to drag the bucket forward and owing to the fact that the drag line bail is thus attached above the digging line it tends to tip the bucket slightly downwardly forward to enable the cutting lip to dig. This dragging movement will continue until the bucket is filled, all of the parts on the hoisting line being slack.

Without slackening the drag line the hoisting rope is now drawn in tending to rotate the hoisting bail as shown in Fig. 1 about its pivotal point on the bucket, back from the front end of the bucket until it assumes a substantially vertical position as shown in Fig. 2. This tightens up the bridle $A^{10}$ and the bucket has now a lifting force applied to it at three points, namely, at the point $A^4$ where it is lifted by the dead end of the cable $B^3$, at the pivotal point of the hoisting bail, and at the point of application of the bridle. As the cable $B^3$ continues to be drawn in to lift the bucket the bucket rises and the instant it commences to rise it is lifted above the drag line and instantly the drag line commences to exert a force on the end of the drag line bail which has a downward component and this downward component tends to rotate the drag line bail toward the position shown in Fig. 2. As this bail rotates it forces the bridle $A^{10}$ to approach parallelism with itself and this compels the sheave $A^7$ to travel along the bridle toward the point at which the bridle is attached to the bucket. The result of this is to rotate the hoisting bail toward the front end of the bucket, and, since the hoisting bail is being lifted and cannot descend, the front end of the bucket must rotate and rise toward the hoisting bail, thus lifting the front end of the bucket more rapidly at first than the rear end until it reaches the position shown in Fig. 2 and then holding the bucket with its front elevated as there shown.

To dump the bucket it is only necessary to release the tension of the drag line. The weight of the front end of the bucket which is being supported by the end of the bridle will now no longer be supported by the bridle because releasing the drag line releases the tension on the bridle. The front end of the bucket will then drop and the drag line bail will swing up to the position shown in Fig. 3, thus permitting the front end of the bucket to fall away from the hoisting bail into the dumping position shown in Fig. 3 when the material can slide out. The tension on the end of the cable $B^3$ applied to the bucket at $A^4$ of course being unbalanced in the dumping position by the tension of the bridle tends to raise the rear end of the bucket and force it into the dumping position. The fact that the end of the bridle $A^{10}$ is attached to the yoke $A^9$ at a point intermediate the pivotal point of the yoke and the point at which the drag line is attached to it gives when the yoke or bail is rigid, as indicated by the drawing, a certain mechanical advantage to the downward component of the force exerted by the drag line. This, of course, would not be present if the yoke or bail were not rigid and in any event, is under ordinary circumstances not essential. The operation would be the same if the bridle and drag line were attached at the same point.

I claim:

1. In a drag line excavator the combination of an excavating bucket with a hoisting line having a downwardly depending loop and end, the latter attached near the rear of the bucket, a hoisting yoke attached near the middle of the bucket and having a movable connection with the loop of the line, a drag line having a loop attached near the forward end of the bucket and a connection between and movable on the two loops.

2. In a drag line excavator the combination of an excavating bucket with a hoisting line having a downwardly depending loop and end, the latter attached near the rear of the bucket, a hoisting yoke attached near the middle of the bucket, a sheave in the loop of the line attached to the end of the hoisting yoke, a drag line having a loop attached near the forward end of the bucket and a sheave in such loop attached to the yoke.

3. In a drag line excavator the combination of an excavating bucket with a hoisting line having a downwardly depending loop and end, the latter attached near the rear of the bucket, a hoisting yoke attached near the middle of the bucket and having a movable connection with the loop of the line, a drag line having a loop attached near the forward end of the bucket and a connection between and movable on the two loops, the drag line loop being formed in part of a bail from the drag line proper to the forward end of the bucket.

4. In a drag line excavator the combination of an excavating bucket with a hoisting line of an excavating bucket with a hoisting line and having a downwardly depending loop and end, the latter attached near the rear of the bucket, a hoisting yoke attached near the middle of the bucket, a sheave in the loop of the line attached to the end of the yoke, a drag line having a loop attached near the forward end of the bucket and a sheave in such loop attached to the yoke, the drag line loop being formed in part of a bail from the drag line proper to the forward end of the bucket.

5. In a drag line excavator the combination of an excavating bucket with a hoisting line having a downwardly depending loop and end, the latter attached near the rear of the bucket, a hoisting yoke attached near the middle of the bucket, a drag line having a loop attached near the forward end of the bucket and connections from the hoisting yoke to both loops and movable thereon.

6. In a drag line excavator the combination of an excavating bucket with a hoisting line having a downwardly depending loop and end, the latter attached near the rear of the bucket, a hoisting yoke attached near the middle of the bucket, a drag line having a loop attached near the forward end of the bucket, connections from the yoke to both loops and movable thereon comprising sheaves one in each loop and both attached to the yoke.

7. In a drag line excavator the combination of an excavating bucket with a hoisting line having a downwardly depending loop and end, the latter attached near the rear of the bucket, a hoisting yoke attached near the midle of the bucket, a drag line having a loop attached near the forward end of the bucket and connections from the yoke to both loops and movable thereon, the drag line loop being formed in part of a bail from the drag line proper to the forward end of the bucket.

8. In a drag line excavator the combination of an excavating bucket with a hoisting line having a downwardly depending loop and end, the latter attached near the rear of the bucket, a hoisting yoke attached near the middle of the bucket, a drag line having a loop attached near the forward end of the bucket, connections from the yoke to both loops and movable thereon comprising sheaves one in each loop and both attached to the yoke, the drag line loop being formed in part of a bail from the drag line proper to the forward end of the bucket.

9. In a drag line excavator the combination of a bucket with a hoisting bail pivotally mounted thereon, a hoisting line attached at the rear end to the bucket and in movable engagement with the hoisting bail, a drag line bail pivotally attached to the front end of the bucket and a drag line attached to said bail and a controlling line attached at one end to said bail and at the other end to the front end of the bucket and in movable connection with the hoisting bail.

In testimony whereof, I affix my signature in the presence of two witnesses this 18th day of April 1913.

LAWRENCE ROYS.

Witnesses:
W. J. RYAN,
H. D. TAYLOR.